United States Patent Office 3,373,221
Patented Mar. 12, 1968

3,373,221
REACTION PRODUCTS OF UNSATURATED ESTERS OF POLYEPOXIDES AND UNSATURATED CARBOXYLIC ACIDS, AND POLYISOCYANATES
Clayton A. May, Orinda, Calif., assignor to Shell Oil Company, New York, N.Y., a corporation of Delaware
No Drawing. Filed Nov. 4, 1964, Ser. No. 408,772
16 Claims. (Cl. 260—837)

ABSTRACT OF THE DISCLOSURE

Compositions are prepared from polyepoxides and unsaturated mono and dicarboxylic acids forming ester linkages. These esters are further reacted with polyisocyanates or polythioisocyanates. The ratio of polyepoxide to polycarboxylic acid ranges from 0.5 to 2.0 equivalents. Additionally from 1 to 70% of another ethylenically unsaturated monomer may be present. In an example 68.8 parts of the diglycidyl ether of bisphenol A were combined with 31.2 parts of glacial methacrylic acid and 0.43 parts of tetramethyl ammonium chloride and heated at 115° C. for 1 hr. and 15 min. to form a liquid ester. This was combined with styrenes to form a 50% styrene solution. 100 pts. of the polyester styrene soln. were combined with 6 pts. toluene diisocyanate incrementally added, and cured with a peroxide at 115° C.

---

This invention relates to new prepolymers of unsaturated polyesters and to their preparation. More particularly, the invention relates to new soluble and curable prepolymers prepared from a special class of unsaturated polyesters, to their preparation and to the use of the new prepolymers, particularly in the formation of laminated products.

Specifically, the invention provides new and particularly useful soluble and curable prepolymers comprising the reaction product of (1) a unsaturated polyester of a polyepoxide possessing more than one vic-epoxy group and preferably a glycidyl polyether and an ethylenically unsaturated organic carboxylic acid, and (2) an isocyanate of the group consisting of polyisocyanates and polythioisocyanates. The invention further provides a process for preparing these prepolymers which comprises reacting the unsaturated polyester with controlled proportions of the isocyanate.

As a special embodiment, the invention provides a special class of soluble curable prepolymers which have varying viscosities and are particularly useful in the preparation of laminated products. These special prepolymers comprise the reaction product of (1) an unsaturated polyester having the formula

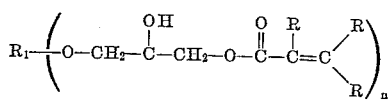

wherein $R_1$ is an aromatic radical, R is hydrogen or alkyl, and $n$ is an integer of 2 to 4, and (2) a polyisocyanate such as, for example, toluene diisocyanate.

The invention further provides new and valuable laminated products prepared from the above-described curable soluble prepolymers.

Cured polyepoxides have many desired properties, such as solvent and chemical resistance and good adhesion to metal and there has been a desire to transfer many of these properties over to the conventional polyester type products. I have found that this can be accomplished by reaction of the polyepoxides with an unsaturated monocarboxylic acid such as acrylic or methacrylic acid. The products prepared in this manner can be cured in the presence of peroxide catalysts to form products having the desired characteristics of the polyepoxides as well as those of the unsaturated polyesters.

The use of these products for certain applications, however, is rather limited because of the low viscosity of the products. It would be desirable, for example, for using these products in applications such as in preparing laminates to have a material of greater viscosity.

It is therefore an object of the invention to provide a new class of modified polyesters prepared from polyepoxide. It is a further object to provide a new class of prepolymers prepared from unsaturated polyesters which have increased viscosity. It is a further object to provide new prepolymers prepared from polyepoxide polyesters which are stable at room temperature but can be cured at elevated temperatures to form superior laminated products. It is a further object to provide new stable prepolymers of unsaturated polyesters which can be prepared with a variety of viscosities. It is a further object of the invention to provide new and valuable laminated products prepared from the aforementioned prepolymers. These and other objects of the invention will be apparent from the following detailed description thereof.

It has now been discovered that these and other objects may now be accomplished by the new products of the invention comprising soluble curable prepolymers which are obtainable by reacting (1) an unsaturated polyester of a polyepoxide having more than one vic-epoxy group and an ethylenically unsaturated organic carboxylic acid, and (2) an isocyanate of the group consisting of polyisocyanates and polythioisocyanates. It has been found that these new prepolymers can be prepared with a variety of viscosities by controlling the amount of the isocyanate added to the reaction mixture. By thus controlling the proportions one is able to obtain products having a wide range of viscosities which can be used for a great variety of different applications. It has been found, for example, that the prepolymers having increased viscosities, e.g., from 20 cps. to 100 cps., can be used to prepare laminated products having improved properties such as hardness, resistance to solvents and the like. These properties make the new prepolymers ideal materials for preparing laminated products useful for making chemically resistant tanks and vessels.

The unsaturated polyesters used in making the new prepolymers are those obtained by reacting polyepoxides having more than one vic-epoxy group with ethylenically unsaturated organic acids.

The polyepoxides used in the process of the invention comprise those compounds possessing more than one vic-epoxy group, i.e., more than one $$-\overset{\text{O}}{\underset{}{\diagup\diagdown}}-\overset{}{\text{C}}-\overset{}{\text{C}}-$$

group. These polyepoxides may be saturated or unsaturated, aliphatic, cycloaliphatic, aromatic or heterocyclic and may be substituted if desired with non-interfering substituents, such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the glycidyl ethers of novolac resins, i.e., phenol-aldehyde condensates. Preferred resins of this type are those of the formula:

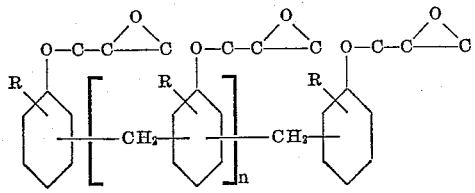

wherein R is hydrogen or an alkyl radical and $n$ is an integer of 1 to about 10. Preparation of these polyepoxides is illustrated in U.S. 2,216,099 and 2,658,885.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecanedienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, diglycidyl adipate,
diglycidyl isophthalate,
di(2,3-epoxybutyl) adipate,
di(2,3-epoxybutyl) oxalate,
di(2,3-epoxyhexyl) succinate,
di(3,4-epoxybutyl) maleate,
di(2,3-epoxyoctyl) pimelate,
di(2,3-epoxybutyl) phthalate,
di(2,3-epoxyoctyl) tetrahydrophthalate,
di(4,5-epoxydodecyl) maleate,
di(2,3-epoxybutyl) terephthalate,
di(2,e-epoxypentyl) thiodipropionate,
di(5,6-epoxytetradecyl) diphenyldicarboxylate,
di(3,4-epoxyheptyl) sulfonyldibutyrate,
tri(2,3-epoxybutyl) 1,2,4-butanetricarboxylate,
di(5,6-epoxypentadecyl) tartarate,
di(4,5-epoxytetradecyl) tartarate,
di(4,5-epoxytetradecyl) maleate,
di(2,3-epoxybutyl) azelate,
di(3,4-epoxybutyl) citrate,
di(5,6-epoxyoctyl) cyclohexane-1,3-dicarboxylate,
di(4,5-epoxyoctadecyl) malonate.

Another group of the epoxy-containing materials include those epoxidized esters of unsaturated alcohols and unsaturated carboxylic acids, such as glycidyl glycidate,
2,3-epoxybutyl 3,4-epoxypentanoate;
3,4-epoxyhexyl 3,4-epoxypentanoate;
3,4-epoxycyclohexyl 3,4-epoxycyclohexyl
methyl epoxycyclohexane carboxylate.

Still another group of the epoxy-containing materials include epoxidized derivatives of polyethylenically unsaturated polycarboxylic acids, such as, for example, dimethyl 8,9,12,13-diepoxyeicosanedioate;
13-diepoxyeicosanedioate;
dihexyl 6,7,10,11-diepoxyhexadecanedioate;
didecyl-9-epoxyethyl-10,11-epoxyoctadecanedioate;
dibutyl 3-butyl-3,4,5,6-diepoxycyclohexane-1,2-dicarboxylate;
dicyclohexyl 3,4,5,6-diepoxycyclohexane-1,2-dicarboxylate;
dibenzyl 1,2,4,5-diepoxycyclohexane-1,2-dicarboxylate and
diethyl 5,6,10,11-diepoxyoctadecyl succinate.

Still another group comprises the epoxidized polyester obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting the diethylene glycol with 2-cyclohexane-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

The other component in the reaction comprises an ethylenically unsaturated organic carboxylic acid which may be aliphatic. cycloaliphatic or aromatic, and may be monocarboxylic or polycarboxylic. Examples of the acids to be utilized include acrylic acid, methacrylic acid, cyclohexene carboxylic acid, maleic acid, crotonic acid, alpha-phenylacrylic acid, tetrahydrophthalic acid, 2,4-octadienedicarboxylic acid, dodecadienoic acid and the like.

Particularly preferred acids to be utilized comprise the ethylenically unsaturated acids such as, for example, acrylic acid, methacrylic acid, crotonic acid, alpha-phenylacrylic acid, alpha-cyclohexylacrylic acid, maleic acid, alpha-chloromaleic acid, tetrahydrophehalic acid, itaconic acid, fumaric acid, cyanoacrylic acid, methoxyacrylic acid, and the like.

Also particularly preferred are the partial esters of polycarboxylic acids, and particularly the alkyl, alkenyl, cycloalkyl and cycloalkenyl esters of polycarboxylic acids such as, for example, allyl hydrogen maleate, butyl hydrogen maleate, allyl hydrogen, tetrahydrophthalate, allyl hydrogen succinate, allyl hydrogen fumarate, butenyl hydrogen tetrahydrophthalate, cyclohexenyl hydrogen maleate, cyclohexyl hydrogen tetrahydrophthalate, and the like, and mixtures thereof.

Coming under special consideration, particularly because of the superior coating properties of the resulting prepolymers, are the ethylenically unsaturated monocarboxylic acids and unsaturated partial esters, and especially the unsaturated aliphatic monocarboxylic acids containing 3 to 10 carbon atoms, and the alkenyl and alkyl esters of alkenedioic acids containing up to 12 carbon atoms.

The unsaturated polyesters are preferably prepared by reacting the above components in the presence of a catalyst, such as a tertiary amine, phosphine or onium compound.

The preferred catalyst to be utilized in the process comprises the onium salts, and preferably those containing phosphorous, sulfur or nitrogen, such as, for example, the phosphonium, sulfonium and ammonium salts of inorganic acids. Examples of these include, among others, benzyltrimethylammonium sulfate, benzyltrimethylammonium nitrate, diphenyldimethylammonium chloride, benzyltrimethylammonium chloride, diphenyldimethylammonium nitrate, diphenylmethylsulfonium chloride, cyclohexylsulfonium bromide, triphenylmethylphosphonium iodide, diethyldibutylphosphonium nitrate, trimethylsulfonium thiocyanate, triphenylsulfonium chloride, dicyclohexyldiamylphosphonium iodide, benzyltrimethylammonium thiocyanate, and the like, and mixtures thereof.

Preferred onium salts to be employed include those of the formulae

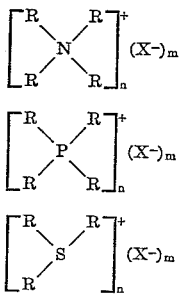

wherein R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen atom, nitrate, sulfate or phosphate radical, $m$ is the valency of the X ion and $n=m$.

The amount of the above-noted polyepoxide and acid to be used in the reaction may vary over a wide range. In general, these reactants are used in approximately chemically equivalent amounts. As used herein and in the appended claims a chemical equivalent amount of the polyepoxide refers to that amount needed to furnish one epoxy group per carboxyl group. Excess amounts of either reactant can be used. Preferred amounts range from about 0.5 to 2 equivalents of epoxide per equivalent of carboxylic acid.

The amount of the catalyst employed may also vary over a considerable range. In general, the amount of the catalyst will vary from about .05% to about 3% by weight, and more preferably from .1% to 2% by weight of the reactants.

The reaction may be conducted in the presence or absence of solvents or diluents. In most cases, the reactants will be liquid and the reaction may be easily effected without the addition of solvents or diluents. However, in some cases, whether either or both reactants are solids or viscous liquids it may be desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent may be retained in the reaction mixture. Otherwise, the solvent can be removed by any suitable method such as by distillation and the like. If the product is not to be used for some time after its formation, it may also be desirable to remove the catalyst used in the preparation, such as by stripping and the like.

Temperatures employed in the reaction will generally vary from about 50° C. to about 150° C. In most cases, the reactants will combine in the presence of the new catalysts at a very rapid rate and lower temperatures will be satisfactory. Particularly preferred temperatures range from about 50° C. to 120° C.

The reaction will be preferably conducted under atmospheric pressure, but it may be advantageous in some cases to employ subatmospheric or superatmospheric pressures.

The course of the reaction may be conveniently followed by determination of the acidity. The reaction is considered to be substantially complete when the acidity has been reduced to about .020 eq./100 g. or below.

The preparation may be effected in any suitable manner. The preferred method merely comprises adding the polyepoxide, acid, catalyst, and solvent or diluent, if desired, in any order and then applying the necessary heat to bring about the reaction. The reaction mixture may then be distilled or stripped to remove any of the necessary components, such as solvents, catalyst, excess reactants and the like.

The polyester products obtained by the above process will vary from liquids to solid resins. The new products will possess a plurality of free OH groups, and in the case of the unsaturated acids, possess a plurality of ethylenic groups, and will be reactive through these groups. The products will be of higher molecular weight than the basic polyepoxide from which they are formed and will possess at least two acid groups per polyepoxide unit.

The polyesters will also possess a linear structure, i.e., free of cross-linking. As a result they will be soluble in acetone and other conventional solvents. They will be relatively non-heat reactive, i.e., difficult to body by heating alone. However, constant application of heat may cause them to suddenly gel.

The new prepolymers of the invention are prepared by reacting the above-described unsaturated polyesters with isocyanate. The preferred isocyanates to be used include the organic polyisocyanate or polyisothiocyanate of the general formula $$R'(NCX)_{m+1}$$

wherein R' represents an organic radical, X represents an oxygen atom or a sulfur atom and $m$ is a positive integer having a value of 1, 2, 3, 4, etc. The reactant $$R'(NCX)_{m+1}$$

may be an aliphatic, cycloaliphatic or aromatic compound or a derivative thereof provided any such derivative contains no substituent which interferes with the reaction. Advantageously, a difunctional organic isocyanate is used. Examples of isocyanates and isothiocyanates are polymethylene diisocyanates and diisothiocyanates, such as ethylene diisocyanate, trimethylene diisocyanate, tetramethylene diisocyanate and pentamethylene diisocyanate, hexamethylene diisocyanate; the corresponding diisothiocyanates, alkylene diisocyanates and diisothiocyanates, such as propylene-1,2-diisocyanate, butylene-1,2-diisocyanate, butylene-2,3-diisocyanate, and butylene-1,3-diisothiocyanate; alkylidene diisocyanate and diisothiocyanates, such as ethylidene diisocyanate, butylidene diisocyanate and ethylidene diisothiocyanate; cycloalkylene diisocyanates and diisothiocyanates, such as cyclopentylene-1,3-diisocyanate, cyclohexylene-1,4-diisocyanate and cyclohexylene-1,2-diisocyanate such as cyclopentylidene diisocyanate, cyclohexylidene diisocyanate and aromatic diisocyanates and diisothiocyanates, such as metaphenylene diisocyanate, paraphenylene diisocyanate, 1-methyl-2,4-phenylene diisocyanate, naphthylene-1,4-diisocyanate, diphenylene-4,4'-diisocyanate or p-phenylene diisothiocyanate; aliphaticaromatic diisocyanates or diisothiocyanates, such as xylene-1,4-diisocyanate, xylylene-1,3-diisocyanate, 4,4'-diphenylenemethane diisocyanate, 4,4'-diphenylenepropane diisocyanate, xylylene-1,4-diisothiocyanate or durene diisocyanate. In fact, any polyisocyanate of polyisothiocyanate of the general formula $$R'(NCX)_{m+1}$$

in which $m$ is any integer, X is oxygen or sulfur and R' is a polyvalent organic radical may be employed.

The prepolymers are prepared by merely combining the above-described unsaturated polyesters with the one or more of the above-described isocyanates in controlled proportions. The amount of the isocyanate will vary depending upon the desired viscosity to be obtained. Preferably, the amount of the isocyanate should not be more than a chemically equivalent amount, i.e., not more than the amount needed to furnish one isocyanate group for every hydroxyl group of the polyester. More preferably, the amount of the isocyanate and polyester should vary in a chemically equivalent ratio of from about 1:1 to 1:10.

The reaction can be accomplished over a wide range of temperatures. In most cases, the reaction would take place at room temperature and it is preferably conducted at or near room temperature. The reaction however can be speeded by the reaction of heat and in this case the preferred temperature ranges from 25° C. to 75° C.

Known catalysts for the isocyanate/OH reaction, such as morpholine, may also be utilized in the reaction mixture to speed the reaction.

The reaction can be accomplished in the presence of solvents or diluents. In some cases, it is preferred to employ monomers and preferably those containing an ethylenic C=C group generally used with unsaturated polyesters such as, for example, styrene, methyl methacrylate, butadiene, acrylonitrile, methacrylonitrile, diallyl phthalate, allyl propionate, isoprene, diallylmaleate, divinyl adipate, dichlorostyrene, ethylene glycol diacrylate and the like. These are preferably used in amounts varying from about 1% to 70% by weight.

The prepolymers obtained by the above-described process will be soluble in solvents such as benzene, acetone and the like and will possess ethylenically unsaturated bonds and can be cured in the presence of peroxides to form insoluble infusible products.

The prepolymer compositions and solutions containing the unsaturated monomers formed by the above process can be cured by heating with peroxide catalysts (e.g., 1% to 10% by weight) to form valuable products. They may be utilized, for example, to form various types of coating and impregnating compositions or in making cast or molded plastic articles. The compositions are particularly suited for use in making laminated products as they have ability to adhere to the substrate and to be cured under conventional limited conditions to form hard heat resistant products having good chemical resistance.

In making the laminates one may apply as by dipping, painting, spraying or padding the desired prepolymer composition or solution onto the substrate, removing any excess material and then subjecting the resulting product to the desired pressure and temperature to effect a cure. The material treated in this manner may be regular sheets of cloth, paper, or wood and the like, or may be strands or fibers which may be alternately woven or wound into the desired composite structure. The new compositions are particularly suited for use in the filament winding technique in that they can be easily applied to the glass strands and treated material wound on the mandrel to form the desired laminated product. The products are then subjected to conventional pressures and temperatures for curing, e.g., 20° C. to 300° C. and pressure 15 p.s.i. to 2000 p.s.i.

To illustrate the manner in which the invention may be carried out the following examples are given. It is to be understood, however, that the examples are for the purpose of illustration and that the invention is not to be regarded as limited to any of the specific conditions or reactants recited therein. Unless otherwise specified, parts described in the examples are parts by weight.

EXAMPLE I

This example illustrates the preparation of a prepolymer composition using an unsaturated polyester obtained by reacting a diglycidyl ether of 2,2-bis(4-hydroxyphenyl) propane hereinafter referred to as Polyether A and methacrylic acid, with toluene diisocyanate.

The unsaturated polyester was prepared as follows:

68.8 parts of Polyether A were combined with 31.2 parts of glacial methacrylic acid and 0.43 part of tetramethyl ammonium chloride and the mixture heated at 115° C. for 1 hour and 15 minutes. During that time, the acidity changed from 0.362 eq./100 g. to about 0.017 eq./100 g. indicating there was substantially complete reaction. The resulting product was an acetone soluble viscous liquid polyester identified as having the following structure:

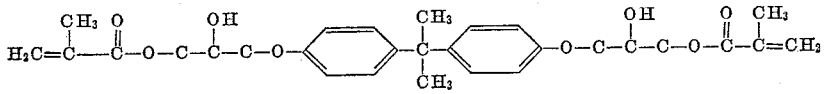

The yield was 100%. This polyester was combined with styrene to form a 50% styrene solution. Such a solution had a viscosity of 16.5 c.p.s.

100 parts of the polyester styrene solution prepared above was combined with 1 part of toluene diisocyanate and the mixture stirred and placed in an oven at 60° C. At the end of that time, the viscosity had increased to 17.6 cps. 1% additional toluene diisocyanate was added, the mixture heated at 60° C. The viscosity increased to 20.2 cps. An additional 1% toluene isocyanate was added and the mixture heated at 60° C. and the viscosity increased to 25.3. A further 1% toluene diisocyanate was added, the mixture heated to 60° C. and the viscosity was 36.7 cps. An additional 1% toluene diisocyanate produced a product having a viscosity of 65.4 and a further additional 1% toluene diisocyanate gave a product having a viscosity of 193 cps.

The solutions prepared above were combined with .5% and 1% ditertiary butyl peroxide and heated at 115° C. The resulting cured products were hard and tough and had good resistance to chemicals, solvents and water.

The styrene diluted product is also useful in the preparation of glass fiber laminated products.

EXAMPLE II

A 50% solution of the unsaturated polyester of Example I was prepared in styrene. To this polyester was added varying amounts of toluene diisocyanate. To the first portion was added 17 phr., to the second was added 8.5 phr. and to the third 4.3 phr. These mixtures were left at room temperature overnight. The resulting products varied in viscosity from 16 cps. up to 200 cps. These products could be used in the making of laminated glass fiber products as in Example I.

EXAMPLE III

This example illustrates the preparation of the prepolymer and simultaneous cure with ditertiary butyl peroxide.

50 parts of unsaturated polyester prepared in Example I was combined with 16.8 parts of toluene diisocyanate, 1.0 part of ditertiary butyl peroxide and 50 parts of styrene. These mixtures were heated to 60° C. The resulting products were hard insoluble infusible castings.

EXAMPLE IV

Examples I–III were repeated with the exception that the toluene diisocyanate was replaced with p,p′-diphenylmethane diisocyanate. Related results are obtained.

EXAMPLE V

Examples I–IV are repeated with the exception that the unsaturated polyester utilized was one prepared by reacting Polyether A with acrylic acid. Related results are obtained.

EXAMPLE VI

Example I was repeated using toluene diisothiocyanate in place of toluene diisocyanate. Related results are obtained.

EXAMPLE VII

An unsaturated polyester is prepared by reacting diglycidyl resorcinol with methacrylic acid by the method shown in Example I. The resulting product

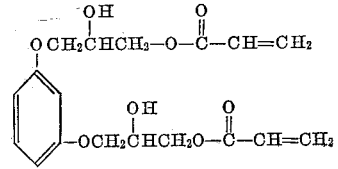

is combined with 50 parts of styrene to form a 50% styrene solution. To 100 parts of this solution was added 1 part of hexamethylene diisocyanate and the mixture stirred and placed in an oven at 60° C. At the end of that time, the viscosity had increased above 2-4 centipoises. Additional of a further amount of the diisocyanate caused further increase in viscosity. The resulting solution was then combined with .5% ditertiary butyl peroxide and the mixture heated at 115° C. The resulting cured product was hard and tough and had good resistance to chemicals, solvents and water.

EXAMPLE VIII

Example I is repeated with the exception that the styrene is replaced with each of the following: vinyl toluene, vinyl acetate, N-vinyl pyrrolidone, allylidiglycol carbonate, allylidone diacetate, triallyl cyanurate, diethyl maleate, diethyl fumarate, fumaronitrile, butyl methacrylate, methyl methacrylate, alpha-methyl styrene, divinyl benzene, acrylamide, vinyl 2-chloroethyl ether, acrylonitrile, and divinyl succinate. Related results are obtained.

EXAMPLE IX

Examples I, II and VIII are repeated with the exception that the ratio of unsaturated ester to unsaturated monomer is changed as follows: 90:5, 85:15, 60:40 and 25.75. Related results are obtained in each case.

I claim as my invention:

1. A prepolymer composition comprising the reaction product of (1) an unsaturated polyester of a polyepoxide containing more than one vic-epoxy group and an ethylenically unsaturated carboxylic acid having no more than two carboxylic groups, the chemical equivalent ratio of polyepoxide to carboxylic acid ranging from 0.5 to 2, and (2) an isocyanate of the group consisting of polyisocyanates and polythioisocyanates.

2. A prepolymer composition comprising the reaction product of (1) a glycidyl polyether of a polyhydric phenol and an ethylenically unsaturated monocarboxylic acid, the chemical equivalent ratio of glycidyl polyether to carboxylic acid ranging from 0.5 to 2, and (2) a polyisocyanate.

3. A soluble prepolymer composition comprising the reaction product of (1) a glycidyl polyether of a polyhydric phenol and an acrylic acid the chemical equivalent ratio of glycidyl polyether to acrylic acid ranging from 0.5 to 2 and (2) an isocyanate of the formula $$R^1(NCX)_{m+1}$$

wherein $R^1$ is a hydrocarbon radical, X is a member of the group consisting of oxygen and sulfur and $m$ is a positive integer having a value of 1 to 4.

4. A prepolymer composition comprising the reaction product of an unsaturated polyester of the formula

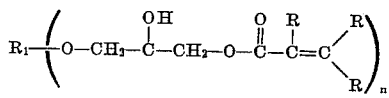

wherein $R_1$ is an aromatic radical and R is a member of the group consisting of hydrogen and alkyl radicals, $n$ is an integer of 2 to 4, and a polyisocyanate.

5. A soluble prepolymer composition as in claim 4 wherein the polyisocyanate is toluene diisocyanate.

6. A prepolymer composition as in claim 4 wherein the polyisocyanate is hexamethylene diisocyanate.

7. A prepolymer composition as in claim 4 wherein the isocyanate is tetramethylene diisocyanate.

8. A benzene soluble prepolymer composition comprising the reaction product of (1) an unsaturated polyester of diglycidyl ether of 2,2-bis(4-hydroxyphenyl)propane and methacrylic acid the chemical equivalent ratio of diglycidyl ether to methacrylic acid ranging from 0.5 to 2, and (2) from .1 to 1.5 equivalent amounts of toluene diisocyanate.

9. A process for preparing acetone soluble prepolymer compositions which comprises reacting (1) a polyester of a polyepoxide containing more than one vic-epoxy group and an ethylenically unsaturated organic carboxylic acid having no more than two carboxylic groups, the chemical equivalent ratio of polyepoxide to carboxylic acid ranging from 0.5 to 2, and (2) an isocyanate of the group consisting of polyisocyanates and polythiocyanates.

10. A process as in claim 9 wherein the isocyanate is employed in from .5 to 1 equivalent amounts based on the polyester.

11. A process as in claim 9 wherein the isocyanate is toluene diisocyanate.

12. A process as in claim 9 wherein the unsaturated polyester is an ester of a glycidyl ether of a polyhydric phenol and an acrylic acid.

13. A process as in claim 9 wherein the unsaturated polyester is an ester of diglycidyl ether of 2,2-bis(4-hydroxyphenyl)propane and methacrylic acid.

14. A prepolymer composition as in claim 1 containing 1% to 70% by weight of a dissimilar ethylenically unsaturated monomer.

15. A prepolymer composition as in claim 1 containing 1% to 70% by weight of styrene.

16. A process for preparing an acetone soluble prepolymer composition which comprises reacting (1) a composition containing (a) an unsaturated polyester reaction product of a polyepoxide and an ethylenically unsaturated carboxylic acid having no more than two carboxylic groups, the chemical equivalent ratio of polyepoxide to carboxylic acid ranging from 0.5 to 2, and (b) a dissimilar vinyl monomer, with (2) a polyisocyanate.

References Cited

UNITED STATES PATENTS

| | | | |
|---|---|---|---|
| 3,242,108 | 3/1966 | McGary | 260—830 |
| 2,824,851 | 2/1958 | Hall | 260—837 |
| 3,256,226 | 6/1966 | Fekete | 260—837 |

MURRAY TILLMAN, *Primary Examiner.*

P. LIEBERMAN, *Assistant Examiner.*